US005864796A

United States Patent [19]

Inoue et al.

[11] Patent Number: 5,864,796

[45] Date of Patent: Jan. 26, 1999

[54] SPEECH SYNTHESIS WITH EQUAL INTERVAL LINE SPECTRAL PAIR FREQUENCY INTERPOLATION

[75] Inventors: Akira Inoue, Tokyo; Masayuki Nishiguchi, Kanagawa, both of Japan

[73] Assignee: Sony Corporation, Tokyo, Japan

[21] Appl. No.: 796,555

[22] Filed: Feb. 6, 1997

[30] Foreign Application Priority Data

Feb. 28, 1996 [JP] Japan .................................... 8-041356

[51] Int. Cl.[6] ................................ G01L 3/02; G01L 9/00

[52] U.S. Cl. ............................................ 704/219; 704/265

[58] Field of Search .................................... 704/217, 221, 704/223, 222, 219, 265

[56] References Cited

U.S. PATENT DOCUMENTS

| | | | |
|---|---|---|---|
| 4,435,832 | 3/1984 | Asada et al. | 704/262 |
| 4,979,188 | 12/1990 | Kotzin et al. | 704/222 |
| 5,351,338 | 9/1994 | Wigren | 704/219 |
| 5,371,853 | 12/1994 | Kao et al. | 704/223 |
| 5,414,796 | 5/1995 | Jacobs et al. | 704/221 |
| 5,642,465 | 6/1997 | Scott et al. | 704/220 |
| 5,699,477 | 12/1997 | McCree | 704/216 |
| 5,778,334 | 7/1998 | Ozawa | 704/219 |
| 5,787,389 | 7/1998 | Taumi | 704/219 |

FOREIGN PATENT DOCUMENTS

| | | |
|---|---|---|
| 0742548 | 11/1996 | European Pat. Off. . |
| 2131659 | 6/1984 | United Kingdom . |

OTHER PUBLICATIONS

Yang et al., *A 5.4 kbps Speech Coder Based on Multi–Band Excitation and Linear Predictive Coding,* Proceedings of the Region 10 Annual International Conference (Tence, Singapore, Aug. 22–24, 1994), vol. 1, pp. 417–421.

Ai et al., *A 6.6kb/s CELP Speech Coder: High Performance for GSM Half–Rate System,* 1994 International Symposium on Speech, Image Processing and Neural Networks (Hong Kong, Apr. 13–16, 1994), ISBN 0–7803–1865–X, vol. 2, pp. 555–558.

*Primary Examiner*—David R. Hudspeth
*Assistant Examiner*—Scott Richardson
*Attorney, Agent, or Firm*—Jay H. Maioli

[57] ABSTRACT

A speech synthesis apparatus in which spectrum emphasis characteristics can be set easily taking into account the frequency response and psychoacoustic hearing sense and in which the degree of freedom in setting the response is larger. An excitation signal ex(n) is synthesized by a synthesis filter 12 to give a synthesized speech signal which is sent to a spectrum emphasis filter 13. The spectrum emphasis filter 13 spectrum-emphasizes the synthesized speech signal and outputs the resulting spectrum-emphasized signal. The vocal tract parameters from an input terminal 21 are converted by a parameter conversion circuit 23 into linear spectral pair (LSP) frequencies which are interpolated by an LSP interpolation circuit 24 with equal-interval line spectral pair frequencies to produce interpolated LSP frequencies. The transfer function of the spectrum emphasis filter 13 is determined on the basis of the interpolated LSP frequencies.

8 Claims, 5 Drawing Sheets

SPEECH SYNTHESIS WITH EQUAL INTERVAL LINE SPECTRAL PAIR FREQUENCY INTERPOLATION

BACKGROUND OF THE INVENTION

1. Field of the Invention

This invention relates to a speech synthesis method and apparatus for synthesizing excitation signals by a synthesis filter for producing a synthesized speech signal.

2. Description of the Related Art

In a speech synthesis apparatus employing a synthesis filter, it has been practiced to use a post-filter placed directly after the speech synthesis filter for improving subjective quality of the speech signal.

As such post filter, there is known one having characteristics of emphasizing the spectrum of the synthesized speech obtained by a synthesis filter. This spectrum emphasizing effect may be realized by connecting a filter having characteristics corresponding to blunted frequency characteristics of the synthesis filter, that is a filter having characteristics proximate to flat characteristics, in tandem with a synthesis filter.

FIG. 1 schematically shows the structure of a speech synthesis device employing an LPC synthesis filter 102 performing speech synthesis by exploiting linear predictive coding (LPC). In FIG. 1, an excitation signal ex(n) and LPC coefficients {α(i)} (i=1, 2, . . . , N) are supplied to input terminals 101, 106, respectively. The LPC synthesis filter 102 filters the excitation signal ex(n)to produce a synthesized speech signal s1(n). The transfer function 1/A(z) of the LPC synthesis filter 102 may be represented, by the supplied LPC coefficients {α(i)}, in accordance with the equation (1):

$$\frac{1}{A(z)} = \frac{1}{1 + \sum_{i=1}^{N} \alpha[i] z^{-i}} \tag{1}$$

The synthesized speech signal s1(n) is sent to a spectrum emphasizing filter 103 for spectrum emphasis and taken out as a speech signal s2(n) at an output terminal 104.

With the spectrum emphasizing filter 103, operating as a conventional post-filter, the poles of the transfer function of the LPC synthesis filter 102 are shifted radially towards the origin (0) for producing a transfer function having characteristics corresponding to frequency characteristics of the synthesis filter. If only the denominator is processed, tilt of low range emphasis is left, so the blunted characteristics are applied to the numerator by way of tilt adjustment, in accordance with the following equation (2):

$$H(z) = \frac{A(z/g_n)}{A(z/g_d)} = \frac{1 + \sum_{i=1}^{N} g_n^{\,i} \alpha[i] z^{-i}}{1 + \sum_{i=1}^{N} g_d^{\,i} \alpha[i] z^{-i}} \tag{2}$$

where $0 < gn < gd < 1$.

However, if spectrum emphasis is performed using a filter having characteristics as shown in the equation (2), the coefficients gn, gd are difficult to set, while it is difficult to accommodate frequency characteristics or the psychoacoustic hearing feeling, such that, if proper coefficients are not set, the sound quality becomes worse. There is also a problem that, since the spectrum emphasizing characteristics are determined solely by these two coefficients gn and gd, the degree of freedom in setting the spectrum emphasizing characteristics is lowered.

SUMMARY OF THE INVENTION

It is therefore an object of the present invention to provide a speech synthesis apparatus in which the spectrum emphasizing characteristics can be set easily taking into account accommodation with the frequency characteristics and which has a large degree of freedom in setting the characteristics.

In accordance with the present invention, there is provided a speech synthesis apparatus in which excitation signals are synthesized by a synthesis filter to give synthesized speech signals, which are spectrum-emphasized and output. The speech synthesis apparatus includes interpolation means for interpolating the frequency response of the synthesis filter, represented in terms of line spectral pair frequency, with the equal interval line spectral pair frequency, and spectrum emphasis means for determining the transfer function based on the interpolated line spectral pair frequency from the interpolation means for performing spectrum emphasis on the synthesized speech signals.

For tilt adjustment, a transfer function having spectrum emphasizing characteristics having a denominator and a numerator is preferably used. The denominator and the numerator of the transfer function of the spectrum emphasizing characteristics are preferably determined by two sets of the line spectral pair frequencies found at the time of interpolation.

DESCRIPTION OF THE PREFERRED EMBODIMENTS

Figure 1:
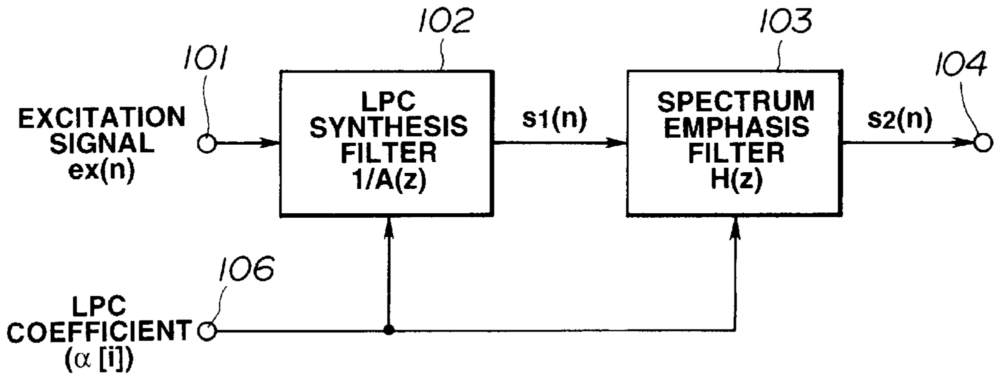
FIG. 1 is a block diagram showing a typical conventional speech synthesis apparatus.
Figure 2:
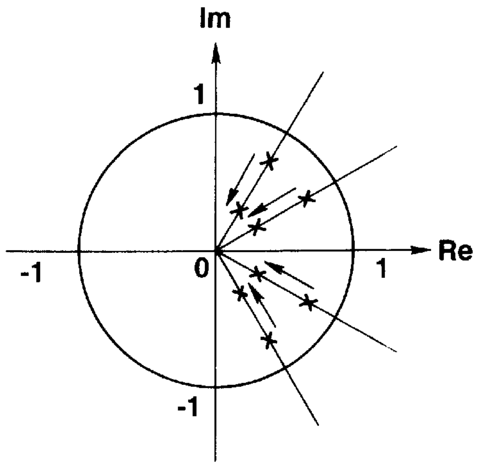
FIG. 2 illustrates the relation between the frequency characteristics of an LPC synthesis filter and those of a spectrum emphasizing filter.

Referring to the drawings, preferred embodiments of the present invention will be explained in detail.

Figure 3:
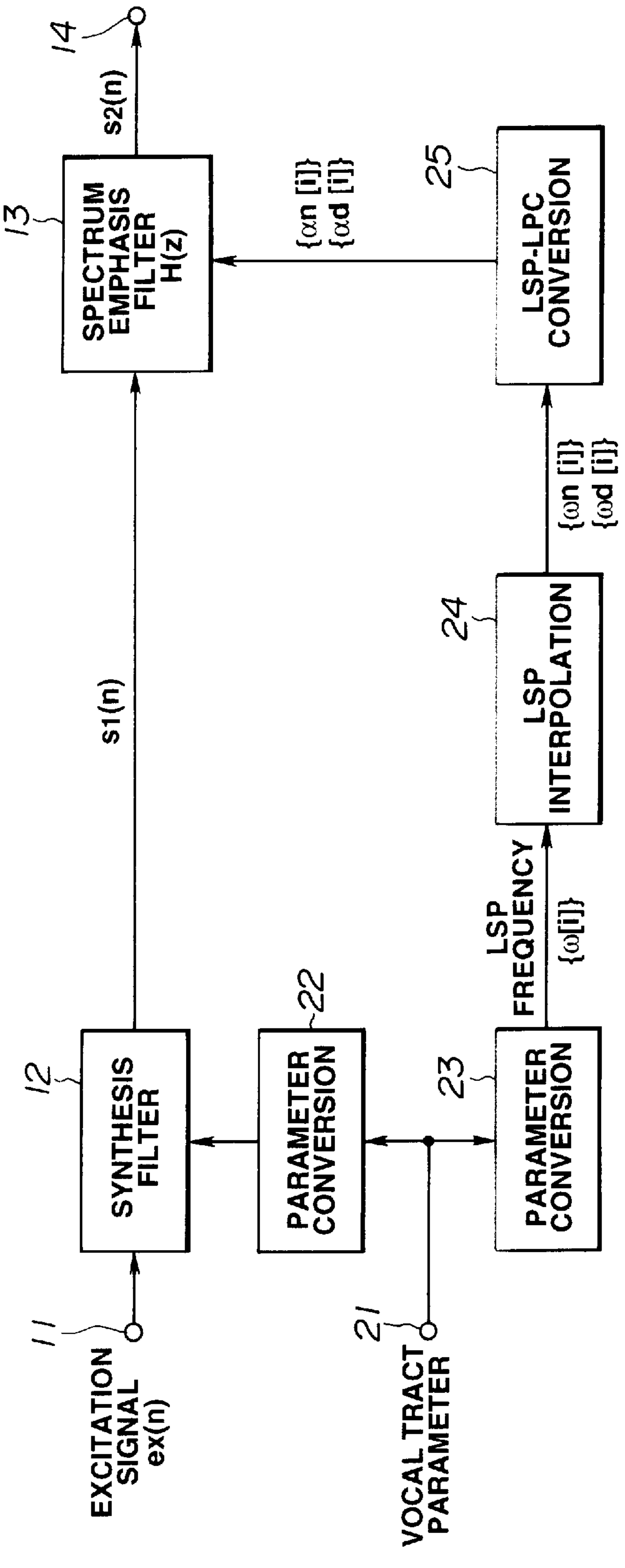
FIG. 3 is a schematic block diagram showing a speech synthesis apparatus embodying the present invention.

FIG. 3 shows, in a schematic block diagram, a speech synthesis method and apparatus embodying the present invention.

The basic concept of the speech synthesis apparatus embodying the present invention resides in that, in spectrum-emphasizing, by a spectrum emphasizing filter 13, the synthesized speech signals obtained on synthesizing the excitation signal from an input terminal 11 by a synthesis filter 12, the frequency characteristics of the synthesis filter 12, represented in terms of linear spectrum pair (LSP) frequency, is interpolated with the equal-interval LSP frequency, and that the frequency characteristics of the spectrum emphasizing filter 13 are determined responsive to the resulting interpolated LSP frequency.

Referring to FIG. 3, an excitation signal ex(n) for speech synthesis is supplied to the input terminal 11, while vocal tract parameters for setting filter characteristics are supplied to an input terminal 21. The excitation signal ex(n) from the input terminal 11 is sent to the synthesis filter 12 where it becomes a synthesized speech signal s1(n) which is sent to the spectrum emphasizing filter 13. The spectrum emphasizing filter 13 performs post-filtering of emphasizing crests and valleys of the spectrum to produce spectrum-emphasized signal s2(n) which is taken out at an output terminal 14.

The vocal tract parameters from the input terminal 21 are sent to parameter conversion circuits 22, 23. The parameter conversion circuit 22 converts the input vocal tract parameters into filter coefficients for the synthesis filter 12, such as LPC coefficients {α[i]}, where i=1, 2, . . . , N, and sends the coefficients to the synthesis filter 12. With the use of the LPC coefficients {α[i]}, the transfer function 1/A(z) of the synthesis filter 12 becomes:

$$\frac{1}{A(z)} = \frac{1}{1 + \sum_{i=1}^{N} \alpha[i] z^{-i}} \tag{3}$$

The parameter conversion circuit 23 converts the input vocal tract parameters from the input terminal 21 into LSP frequency {ω[i]}, where i=1, 2, . . ., N, and sends the resulting LSP frequency to an LSP interpolation circuit 24. The LSP interpolation circuit 24 interpolates the input LSP frequency {ω[i]} with the equal-interval LSP frequency corresponding to the LSP frequency having flat frequency characteristics to derive two sets of the interpolated LSP frequencies {ωn[i]}, {ωd[i]}, which are sent to an LSP-LPC converting circuit 25. The LSP-LPC converting circuit 25 LSP-LPC converts the two sets of the interpolated LSP frequencies {ω[i]}, {ωd[i]} for producing two sets of LPC coefficients {αn[i]}, {αd[i]}which are sent to the spectrum emphasizing filter 13. By these two sets of LPC coefficients {αn[i]}, {αd[i]}, the transfer function H(z) of the spectrum emphasizing filter 13 becomes:

$$H(z) = \frac{1 + \sum_{i=1}^{N} \alpha_n[i] z^{-i}}{1 + \sum_{i=1}^{N} \alpha_d[i] z^{-i}} \tag{4}$$

Figure 4:
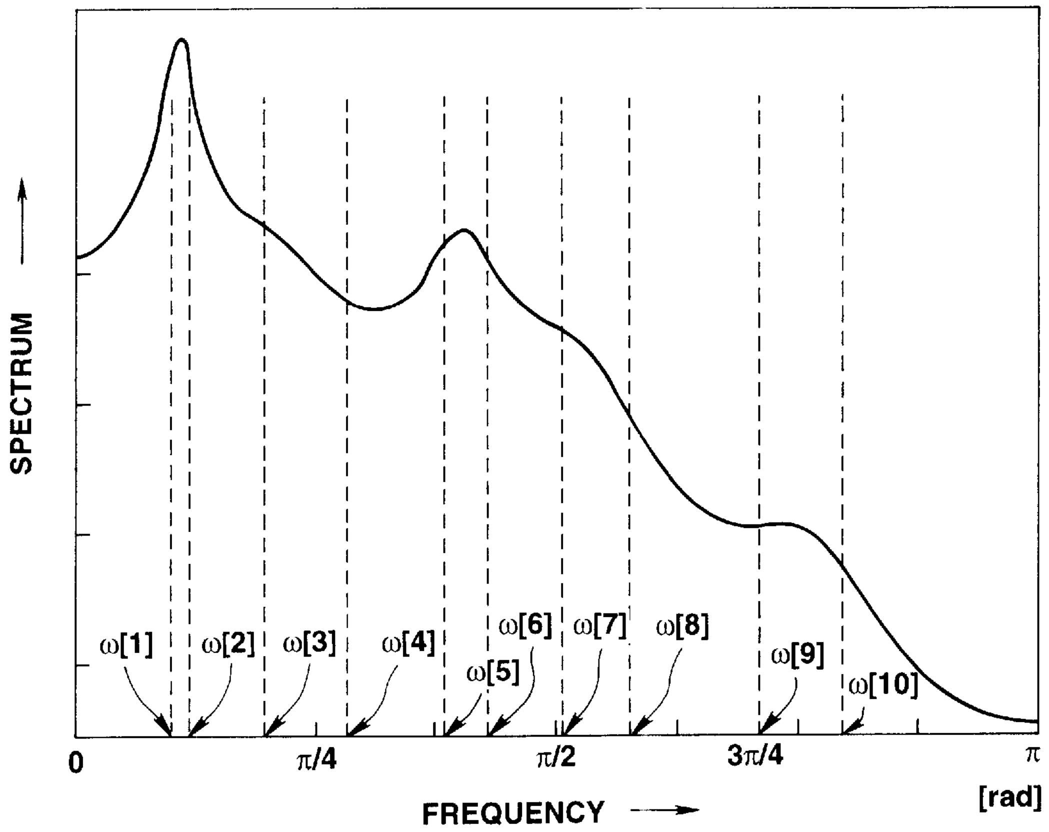
FIG. 4 illustrates the relation between the speech spectrum and the LPC frequency.

The LSP frequency and the LPC frequency are now explained briefly. The LPC coefficients are those obtained by approximating the resonance characteristics of the vocal tract by a ful-polar type IIR (infinite impulse response) filter. On the other hand, the linear spectrum pair (LSP) frequency is that obtained using the resonance frequency of the vocal tract as parameters. FIG. 4 shows the relation between a specified example of the speech spectrum of the vocal tract and the LSP frequency.

The order of the LSP frequencies {ω[i]}, where i=1, 2, 3, . . . , N, is set for satisfying the following relation:

$$0<\omega[1]<\omega[2]<\ldots<\omega[N]<\pi \tag{5}$$

The example of FIG. 4 shows the LSP frequencies ω[1], ω[2], . . . ω[10] for N equal to 10. On the other hand, the LSP coefficient ci is represented by $$ci=-\cos\omega[i],\ \text{where } i=1, 2, \ldots, N. \tag{6}$$

Figure 5:
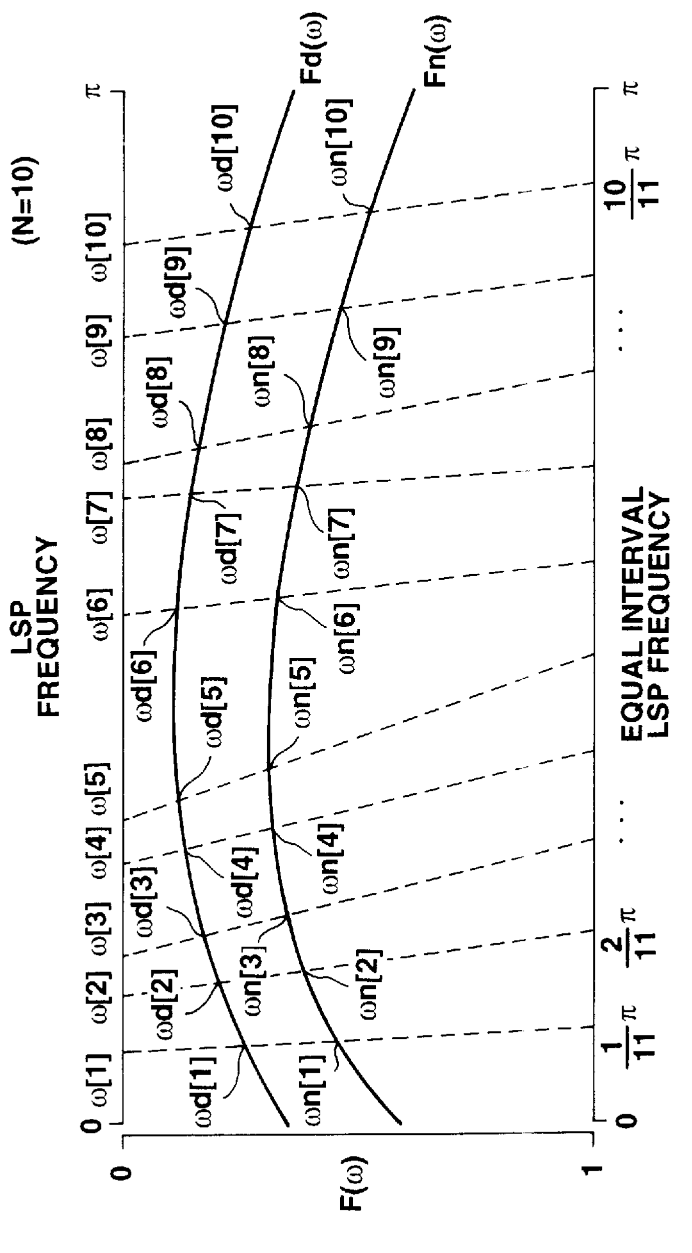
FIG. 5 illustrates interpolation between the LPC frequency as given and the LPC frequency with an equal interval.

The LSP interpolation circuit 24 of FIG. 3 interpolates the input LSP frequency {ω[i]} with the equal-interval LSP frequencies {iπ/(N+1)} having flat frequency characteristics, that is with π/11, 2π/11, . . . , 10π/11 in the example of FIG. 5, using two sets of appropriate interpolation functions Fn(ω), Fd(ω), for producing two sets of interpolated LSP frequencies {ωn(i)}, {ωd(i)} in accordance with the following equations (7) and (8):

$$\omega n[i] = \{1 - Fn(\omega[i])\}\omega[i] + Fn(\omega[i]) \frac{i}{N+1} \pi \tag{7}$$

$$\omega d[i] = \{1 - Fd(\omega[i])\}\omega[i] + Fd(\omega[i]) \frac{i}{N+1} \pi \tag{8}$$

where i=1, 2, . . . , N.

The two sets of the interpolated LSP frequencies {ωn(i)}, {ωd(i)}, thus obtained, are converted by the LSP-LPC conversion circuit 25 of FIG. 3 into {αn(i)} and {αd(i)}, respectively. As for this LSP to LPC conversion, the method for converting the LSP frequency (ω[i]) into the LPC coefficient {α[i]} in general is now explained. The following definitions:

$$A_n(z) = 1 + \sum_{i=1}^{n} \alpha[i] z^{-i} \tag{9}$$

$$B_n(z) = z^{-(n+1)} A_n(1/z) \tag{10}$$

are made. If, in recurrent formulas of partial autocorrelation analysis:

$$A_{n+1}(z)=A_n(z)-k_{n+1}B(z) \tag{11}$$

$$B_n(z)=z^{-(n+1)}A_n(1/z) \tag{12}$$

$A_{n+1}$ (z) where $k_{n+1}$ is set to +1 is P(z) and $A_{n+1}$ (z) where $k_{n+1}$ is −1 is set to Q(z), $$-P(z)=A_n(z)-B(z) \tag{13}$$

$$Q(z)=A_n(z)+B(z) \tag{14}$$

so that $$A_n(z)=[P(z)+Q(z)]/2 \tag{15}$$

If p is even, $$P(z) = (1 - z^{-1})\pi(1 - 2z^{-1}\cos\omega[i] + z^{-2}) \tag{16}$$

$$i = 2, 4, \ldots, P$$

$$Q(z) = (1 + z^{-1})\pi(1 - 2z^{-1}\cos\omega[i] + z^{-2}) \tag{17}$$

$$i = 1, 3, \ldots, P-1$$

Therefore, if the LSP frequency {ω[i]} is given, it is possible to compute P(z) and Q(z) from the equations (16) and (17) and to find the LPC coefficient {α[i]} from the equation (15).

The vocal tract parameters supplied to the input terminal 21 of FIG. 3 may be enumerated by LPC coefficients, LSP coefficients or PARCOR (partial autocorrelation) coefficients. The parameters used by the synthesis filter 12 may similarly be enumerated by LPC coefficients, LSP coefficients or PARCOR (partial autocorrelation) coefficients. Depending on the combination of these parameters, the parameter conversion circuits 22, 23 perform the following parameter conversion operations:

If the input vocal tract parameters are the LPC coefficients, the LPC-LSP conversion circuit, converting the LPC coefficients into the LSP frequencies, may be used as the parameter conversion circuit 23. The particular parameter conversion circuit 22 differs with the type of the synthesis filter 12 used. If an LPC synthesis filter performing speech synthesis using LPC coefficients is used as the synthesis filter 12, the parameter conversion circuit 22 may be eliminated. If the synthesis filter 12 is a filter performing speech synthesis using the LSP frequency, the parameter conversion circuit 22 performing LPC-LSP conversion is used, whereas, if the synthesis filter 12 is a filter performing speech synthesis using the PARCOR coefficients, the parameter conversion circuit 22 performing LPC-PARCOR conversion may be used.

On the other hand, if the input vocal tract parameter is the LSP frequency, the parameter conversion circuit 23 may be dispensed with. In such case, it suffices for the parameter conversion circuit 22 to perform LSP to LPC conversion or LSP to PARCOR conversion if the LPC coefficients or the PARCOR coefficients are used for the synthesis filter 12, respectively. If the LSP frequency is used for the synthesis filter 12, the parameter conversion circuit 22 may be dispensed with.

If the input vocal tract parameter is the PARCOR coefficient, the parameter conversion circuit 23 may be a circuit performing PARCOR-LSP conversion. In this case, the parameter conversion circuit 22 may be a synthesis filter performing PARCOR to LPC conversion and PARCOR to LSP conversion if the LPC coefficients and the LSP coefficients are used in the synthesis filter 12, respectively. If the PARCOR coefficients are used, the parameter conversion circuit 22 may be dispensed with.

Although the spectrum emphasis filter 13 in the above-described embodiment uses LPC coefficients, the spectrum emphasis filter 13 employing the LSP or PARCOR coefficients may also be used. In such case, a conversion circuit performing conversion into parameters required by the emphasis filter 13 may be used in place of the LSP-LPC conversion circuit 25.

Figure 6:
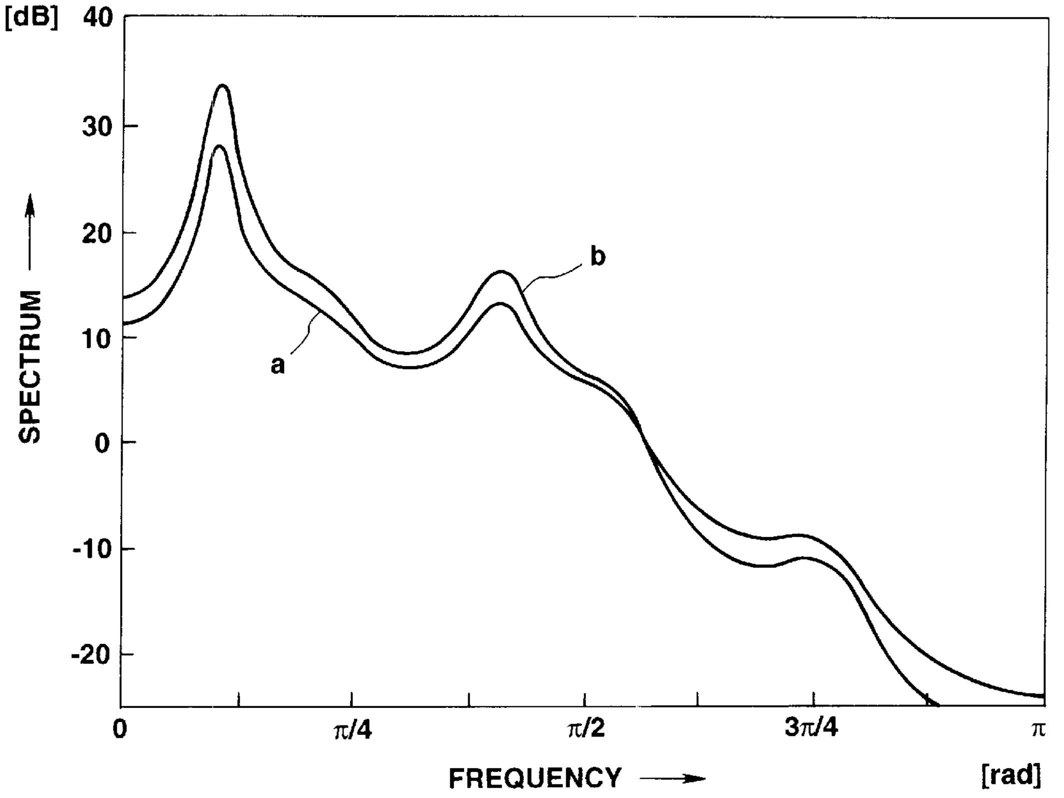
FIG. 6 illustrates specified examples of the speech spectrum ahead and at back of a spectrum emphasizing filter.

With the above-described speech synthesis apparatus, the synthesized speech signal, output by the synthesis filter 12, as shown by a curve a in FIG. 6, is converted by the spectrum emphasis filter 13 into speech signals of a spectrum as shown by a curve b in FIG. 6, that is the crests and valleys of the spectrum are emphasized, thus improving the quality of the synthesized speech. In the embodiment of FIG. 6, the frequency response of the spectrum emphasis filter 13 is determined by using, as interpolation functions Fn(ω) and Fd(ω), the two sets of the LSP frequencies obtained on using the functions Fn(ω)=0.5 and Fd(ω)=0.3, which are flat on the frequency axis, respectively.

The LSP frequency as the parameter governing the frequency response is superior to the LPC coefficients in interpolation characteristics, such that, by interpolating the converted LSP frequency, the spectrum emphasizing characteristics can be set easily taking into account the frequency response and accommodation with the psychoacoustic hearing feeling. Moreover, by optionally selecting the interpolation functions Fn(ω), Fd((ω) of FIG. 3, the degree of freedom in setting the characteristics can be set to a higher value.

As a modification, a order-one high range emphasizing filter may be connected in tandem on the output side of the spectrum emphasizing filter 13 of FIG. 3. This high range emphasizing filter is used for supplementing tilt adjustment for emphasizing the low range of the frequency characteristics to be emphasized. The transfer function of this order-one high range emphasizing filter may be set to $$B(z)=1-\mu z^{-1} \quad (18)$$

where $\mu<1$.

In the partial autocorrelation of the synthesized speech signal, that is in the correlation of prediction residuals of the synthesized speech signal, the order-one partial autocorrelation (PARCOR) coefficient k[1] substantially indicates the tilt of the speech spectral signal. In view hereof, the transfer function of the order-one high-range emphasizing filter may preferably be set to $$B(z)=1-k[1]z^{-1} \quad (19)$$

In the case of the equation (19), the coefficient k[1] is varied depending on the synthesized speech signal thus enabling adaptive order-one high range emphasis.

What is claimed is:

1. A speech synthesis apparatus in which excitation signals are synthesized by a synthesis filter to produce synthesized speech signals, which are spectrum-emphasized and output, comprising:

interpolation means for interpolating a frequency response of the synthesis filter, represented in terms of a line spectral pair frequency, with an equal interval line spectral pair frequency to produce an interpolated line spectral pair frequency; and spectrum emphasis means for determining a transfer function based on the interpolated line spectral pair frequency from said interpolation means for performing spectrum emphasis on the synthesized speech signals.

2. The speech synthesis apparatus as claimed in claim 1 wherein said interpolation means outputs two sets of interpolated line spectral pair frequencies, and said spectrum emphasizing means set a denominator and a numerator of the transfer function based on said two sets of the interpolated line spectral pair frequencies.

3. The speech synthesis apparatus as claimed in claim 1 wherein said spectrum emphasis means includes an order-one high range emphasizing filter having a transfer function B(z), in which $$B(z)=1-\mu z^{-1}$$

where $\mu<1$.

4. The speech synthesis apparatus as claimed in claim 1 wherein said spectrum emphasis means includes an order-one high range emphasizing filter having a transfer function B(z) represented by $$B(z)=1-k[1]z^{-1}$$

wherein k[1] is an order-one partial autocorrelation coefficient of the synthesized speech signal.

5. A speech synthesis method in which excitation signals are synthesized by a synthesis filter to produce synthesized speech signals, which are spectrum-emphasized and output, comprising:

interpolation step for interpolating a frequency response of the synthesis filter, represented in terms of a line spectral pair frequency, with an equal interval line spectral pair frequency to produce an interpolated line spectral pair frequency; and spectrum emphasis step for determining a transfer function based on the interpolated line spectral pair frequency from said interpolation step for performing spectrum emphasis on the synthesized speech signals.

6. The speech synthesis method as claimed in claim 5 wherein said interpolation step outputs two sets of interpolated line spectral pair frequencies, and said spectrum emphasizing step sets a denominator and a numerator of the transfer function based on said two sets of the interpolated line spectral pair frequencies.

7. The speech synthesis method as claimed in claim 5 wherein said spectrum emphasis step includes supplementing tilt adjustment for emphasizing a low range of frequency characteristics to be emphasized, by using an order-one high range emphasizing filter having a transfer function B(z) in which $$B(z)=1-\mu z^{-1}$$

where $\mu<1$.

8. The speech synthesis method as claimed in claim 5 wherein said spectrum emphasis step includes supplementing tilt adjustment for emphasizing a low range of frequency characteristics to be emphasized, by using an order-one high range emphasizing filter having a transfer function represented by $$B(z)=1-kz^{-1}$$

wherein k is an order-one partial autocorrelation coefficient of the synthesized speech signal.

* * * * *